United States Patent [19]

Simkovitz

[11] 4,409,591

[45] Oct. 11, 1983

[54] VARIABLE SIZE CHARACTER GENERATOR

[75] Inventor: Mark D. Simkovitz, Oak Park, Mich.

[73] Assignee: Wayne State University, Detroit, Mich.

[21] Appl. No.: 265,371

[22] Filed: May 20, 1981

[51] Int. Cl.[3] .............................................. G06F 3/14

[52] U.S. Cl. .................................. 340/731; 340/800; 340/750

[58] Field of Search ............... 340/711, 723, 724, 728, 340/731, 735, 748, 749, 750, 799, 800, 802

[56] References Cited

U.S. PATENT DOCUMENTS

| | | | |
|---|---|---|---|
| 3,573,789 | 4/1971 | Sharp et al. | 340/728 |
| 3,614,767 | 10/1971 | Carrell | 340/735 |
| 3,659,283 | 4/1972 | Ophir | 340/731 |
| 3,893,100 | 7/1975 | Stein | 340/731 |
| 4,107,786 | 8/1978 | Masaki et al. | 340/731 |
| 4,129,860 | 12/1978 | Yonezawa et al. | 340/731 |
| 4,242,678 | 12/1980 | Somerville | 340/731 |
| 4,254,409 | 3/1981 | Busby | 340/731 |
| 4,254,416 | 3/1981 | Lelke | 340/731 |
| 4,283,724 | 8/1981 | Edwards | 340/731 |

*Primary Examiner*—Michael A. Masinick
*Attorney, Agent, or Firm*—Basile, Weintraub & Hanlon

[57] ABSTRACT

Apparatus and method of generating variable size, point-display type characters. Each character is defined through a matrix comprising a plurality of identical block elements. One of a predetermined number of geometric patterns forming a section of each character is disposed within each block element. A distinct binary index code is assigned to each geometric pattern on a row-by-row, column-by-column basis of each character matrix for the entire character set to be displayed and stored in a first memory. A binary code defining the sequence of binary states of the points in the point display of each geometric pattern is assigned to each geometric pattern on a line-by-line basis for each block element of the character matrix. The first set of binary codes are selected on a row-by-row, column-by-column basis for the character matrix of the selected character. A second set of binary codes are generated in response to the selected first binary codes, with the second binary codes corresponding to the sequence of binary states of the points defining the point matrix on a line-by-line basis for each block element of the selected character matrix. A binary sequence of signals is generated in response to the second binary codes which are used to generate each character point-by-point.

31 Claims, 14 Drawing Figures

VARIABLE SIZE CHARACTER GENERATOR

BACKGROUND OF THE INVENTION

1. Field of the Invention

This invention relates, in general, to character generators and, more specifically, to variable size character generators and, even more specifically, to variable size character generators for use with video display terminals.

2. Description of the Prior Art

Visual display terminals, such as a CRT, form an integral part of modern computer systems, word processors and the like. These terminals are advantageously used in program development, data display and data manipulation.

Such CRT terminals typically display all or a portion of the page of a written text. Each character of the text is formed in a dot matrix format and, in a conventional 19 inch diagonal screen, is approximately ½ inch in height. This poses a problem for those having impaired or low vision which has hindered the use of computer terminals having CRT screens by these people. To overcome this problem, each individual character must be enlarged to make it readable. During such enlargement, the character must be well-shaped, clearly legible and remain undistorted.

A conventional CRT terminal can display as much as twenty-four lines of eighty characters per line at one time. With enlargement, the number of characters that can be displayed simultaneously decreases. Thus, it is possible to view only a small sequence or portion of one line of information at a particular time. A visually impaired user may also want to read or scan information that is not on display or review information that has been previously displayed. Thus, provisions which enable the user to review any section of the computer output which has been enlarged on the display are needed. Such provisions have heretofore been unavailable in video display terminal technology.

A large number of variable size character generators have been devised for use with point-type display terminals, such as CRT screens or matrix type dot printers. However, such character generators utilize character enlargement techniques which result in characters which are distorted and not easily readable. Furthermore, such enlargement techniques, and in particular those devised for matrix type dot printers, include no provisions for reviewing any portion of the enlarged computer output.

Thus, it would be desirable to provide a variable size character generator which overcomes the problems of similar prior art character generators. It would also be desirable to provide a variable size character generator which provides enlarged characters which are well-shaped, clearly legible and undistorted. It would also be desirable to provide a variable size character generator which is capable of generating a large number of different sized characters. Finally, it would be desirable to provide a variable size character generator which is adapted for use with video display terminals and enables the user to easily view any portion of the enlarged computer output.

SUMMARY OF THE INVENTION

There is disclosed herein a new and improved apparatus and method for generating variable size, point display type characters.

Each character to be displayed is defined by a character matrix in the form of a plurality of identical block elements. One of a predetermined number of distinct geometric patterns, which form the composite character, are disposed within each block element of a character matrix.

A character generator means includes a first memory means for storing binary codes assigned to each one of a predetermined number of geometric patterns in the block elements of the characters to be displayed, with the binary codes being assigned on a row-by-row, column-by-column basis for each character matrix.

The first memory means is responsive to the selected character and outputs binary codes corresponding to the geometric patterns forming the selected character on a row-by-row, column-by-column basis of the character matrix. First means, responsive to the output of the first memory means, is provided for generating second binary codes corresponding to the sequence of binary states of the points defining the point matrices of each block element of the selected character on a line-by-line basis for each block element. The second binary codes correspond to the selected one of the predetermined number of distinct character sizes. Finally, second means, responsive to the second binary codes, is provided for generating binary sequences of signals on a point-by-point basis which are used to generate the selected character having the selected character size.

In a preferred embodiment, the first generating means comprises a memory means which stores the second binary codes. Further, the second generating means includes means for decoding the second binary codes and generating binary control signals useful in displaying the selected character having a selected size.

In a preferred embodiment, the display means comprises a raster scan CRT display terminal. Further, a central processor forms the means for selecting a character and a particular character size. An alphanumeric keyboard is connected to the central processor for inputting character and character size information.

As the CRT display device refreshes the display many times each second, the displayed character information must be regenerated within the character generator. By dynamically altering the initial values of the internal counters in the character generating means during the vertical blanking period of the CRT screen, the enlarged data can be made to roll up or down the screen, as well as crawl at varying rates left or right across the screen. This enables the user to view any desired portion of the enlarged displayed data.

The unique variable size character generator apparatus and method of the present invention overcomes many of the problems of similar prior art variable size character generators in providing enlarged characters that are well-defined, clearly legible and undistorted. In addition, the variable size character generator of the present invention enables the user to view any portion of the enlarged data, which capability has heretofore been unavailable in CRT-type display terminal technology. Finally, the characters may be displayed in a large number of different sizes which enables CRT-type displays to be used by a wide variety of users having differing levels of vision impairments.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
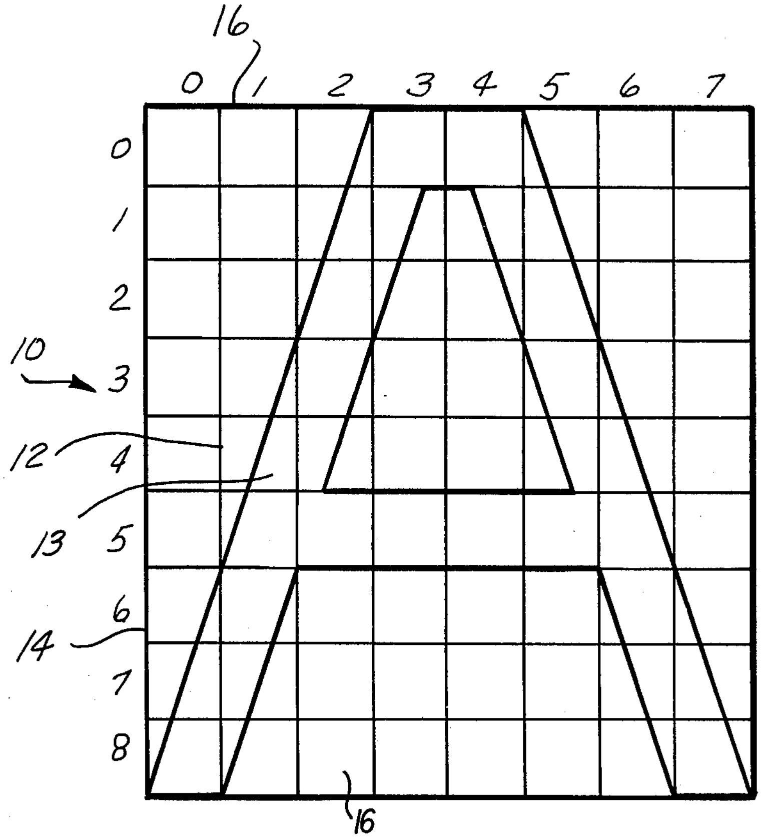
FIG. 1 is a pictorial representation of a 8×9 character matrix showing the formation of the letter A.

Throughout the following description and drawing, an identical reference number is used to refer to the same component shown in multiple figures of the drawing.

In order to provide a clear and concise description of the variable size character generator of the present invention, a discussion of the fundamental principles underlying the operation of the variable size character generator will be presented initially, with a description of a preferred embodiment of the functional implementation or circuitry of the variable size character generator following.

I. Fundamental Principles

The variable size character generator of the present invention is adapted for generating variable size characters for display on a display apparatus, such as a CRT screen. Although a CRT screen is preferred and depicted as the display device of the present invention, the teachings of the present invention are also applicable for any type of point-display apparatus, such as dot matrix type printers.

A. Geometric Character Matrix

The variable size character generator of the present invention is adapted to display the entire set of ASCII characters, as well as a wide variety of other alphanumeric and graphic symbols. The standard ASCII character set includes 96 conventional characters, such as letters, numerals, punctuation, etc., as well as 32 non-displayable special characters. Each character is displayed as a symbol of one tone, i.e., black, set against a background of a second tone, i.e., white. As shown in FIG. 1, each character is defined by a geometric character matrix 10. The character matrix 10 is formed by segmenting each character horizontally and vertically to form the rows and columns of the matrix. A matrix or block element is thus a rectangular block, such as block 12. The block elements may contain shaded areas which correspond to a particular geometric pattern or shape, with the geometric pattern forming a section or part of the composite character.

Although various matrix dimensions are possible, the variable size character generator of the present invention makes use of a 16×8 geometric character matrix. Capital letters, such as the capital A shown in FIG. 1, are formed within a 9×8 matrix, that is, 9 rows 14 by 8 columns 16. Lower case characters having elongated stems make use of the additional rows to extend the symbols or characters above and below the character line. The remaining rows that are not used to represent the ASCII characters provide spacing between successive character lines in the display or are used to display larger graphic symbols.

The 16×8 character matrix is further embedded in an expanded matrix having additional columns, such as a 16×12 matrix. The additional columns provide spacing between adjacent characters on the display.

The dimensions of the characters in the preferred embodiment of the present invention are normalized so that the horizontal and vertical sides of each block element are of unit width and height. The width and height of all of the block elements, such as block element 12, are identical however, other block element configurations in which the width and height of each block element are not equal are also possible.

As shown in FIG. 1, a predetermined number of discrete geometric patterns or shapes are used to form each of the composite characters. These geometric patterns include various slanted line sections which form triangles or trapezoids within each block element. In addition, the geometric pattern may be a blank, i.e., white, that is, no portion of the character is present within a particular block element, or it may be completely solid, i.e., black.

Figure 2:
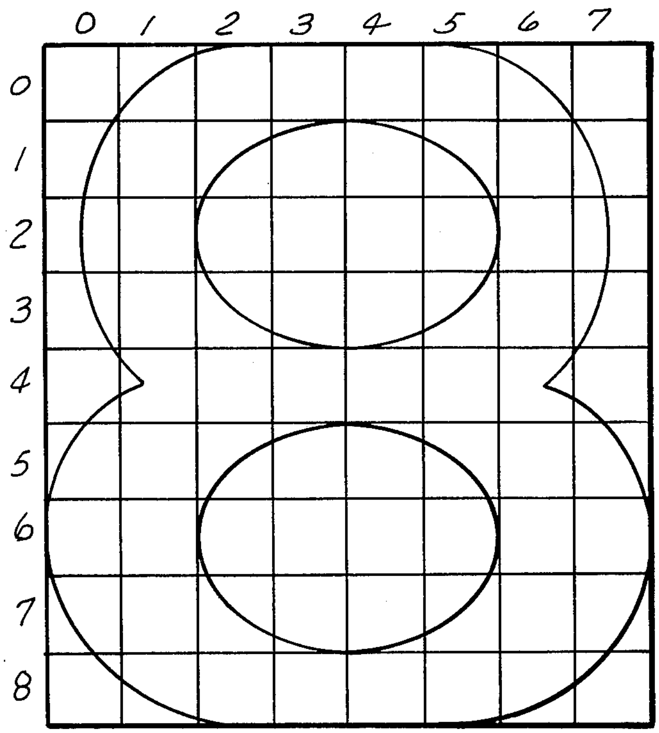
FIG. 2 is a pictorial representation of a 8×9 character matrix showing the formation of the numeral 8.

As shown in FIG. 2, various rounded characters, such as the numeral 8, having curved sections may also be formed via the variable size character generator of the present invention. The curved sections are formed by tangentially joining elliptical subsections with horizontal or vertical line segments.

B. Block Element Covering Sets

In general, a binary code is assigned to each distinct geometric pattern or shape that is used to form the composite characters. It has been noted that a large number of similar shapes occur in different rows and columns of each character matrix such that a substantial reduction in the amount of memory space required to store the binary codes for each character may be realized by combining similar shaped geometric patterns into a set. Preferably, two sets for each row of the character matrix, hereafter referred to as "even and odd covering sets" are utilized. The even covering sets are respectively formed by combining all of the geometric patterns that occur in the even numbered columns 0, 2, 4, 6 for each of the sixteen rows of the character matrices for all of the possible characters. Each even covering set contains a maximum of 16 distinct patterns in each row due to the repetition of similarly shaped geometric patterns in the block elements of the characters.

The geometric patterns for all of the characters that occur in the odd numbered columns, 1, 3, 5 and 7 of the geometric character matrix of each character are combined, on a row-by-row basis, to form the odd covering set. Again, each set contains a maximum of 16 distinct geometric patterns for each row.

Thus, 16 pairs of sets of geometric patterns are generated for representing the total number of geometric patterns used to form the composite characters. As each set contains a maximum of 16 distinct geometric patterns, a four bit binary code is assigned to each distinct geometric pattern within each of the even or odd sets, for each row-by-row pair, to identify the particular geometric pattern in that row of character matrix. This four bit code is identified as the "index code". These codes are stored in memory, as described hereafter, which is addressed by the code of the character to be displayed and the row number of the particular character that is currently being displayed on a column by column basis.

C. Character Display

The display device in the preferred embodiment of the present invention is a CRT or cathode ray tube. The CRT is a raster scan device which displays images one scan line at a time as an electron beam passes across the CRT screen. The entire raster screen is scanned 60 times per second in accordance with United States standards. Each scan consists of a total of 262.5 horizontal line scans, with approximately 240 horizontal lines corresponding to the display portion of the screen. The remaining horizontal passes occur during the vertical period when the electron beam is being off and is returned to the top of the screen to begin another scan of the screen.

Images are displayed on the CRT screen by controlling the intensity of the electron beam. Images of characters are projected as black characters against a white background or the reverse, as white characters against a black background. Thus, only two signal levels are needed to control the intensity of the electron beam. When the beam is on, the projected image is white. When the electron beam is off, the corresponding image is black.

The electron beam will be on or off depending on whether the video control signal is a "1" or "0". The rate at which the video control signal can be switched from a "1" to "0", or vice versa, is determined by the frequency of an internal clock, referred as the dot clock. If the horizontal line scan is alternately switched on and off at the dot clock rate, the frequency of the clock determines the number of distinct dots that can be displayed on a given scan line. Thus, digitally generated images of characters correspond to successive lines of dots which are either "on" or "off".

The characters which are generated by the variable size character generator of the present invention are comprised of rectangular block elements, such as block element 12 in FIG. 1, which contain one of a predetermined number of geometric patterns, such as the geometric trapezoid 13. The size of the image representation of the geometric pattern 13 in block 12 may be varied by varying the number of scan lines and dots that are used to project the image of that geometric pattern on the CRT screen. If only one dot is used to image each block element, such as block element 12, then the entire character will be dislayed on 16 successive scan lines with 8 dots per line. Each dot will be white or black depending on whether the majority of the block element area is white or black. When a single dot is used to image a particular block element, the geometric character matrix is reduced to a dot character matrix. Character size is then approximately the same size as characters generated by conventional CRT terminals using standard dot matrix techniques.

When eight scan lines with eight dots per line are used to image each block element, the full geometric character matrix will be imaged using 128 successive scan lines, with sixty-four dots per line. The height of each character will then be eight times the character size of conventional CRT terminals or one half of the total screen height, i.e., approximately seven inches.

D. Dot Matrix Representation Of Block Element Patterns

Block elements that comprise each section of the displayed characters are generated digitally by the variable size character generator of the present invention. Each block element consists of sequences of dots that are either "on" or "off" and which are displayed during successive line scans. Block element size and, correspondingly, the total character size depends on the number of dots in a sequence and the number of successive scan lines used to image each block element.

The variable size character generator of the present invention is capable of varying character size by varying the number of dots horizontally and the number of scan lines vertically that are used to image each block element of the geometric character matrix of a particular character. According to the preferred embodiment of the present invention, eight distinct character sizes are able to be generated. However, it will be understood that any number of distinct character sizes may be generated by using the principles of the present invention. As noted previously, each block element has unit width and height such that for a given size number N the variable size character generator will generate sequences of dots for each block element having N dots per scan line and N scan lines per block element. It will be understood, however, that, with minor modifications, each block element may be imaged with unequal width and height by displaying $N_W$ dots per line and $N_H$ lines per block element.

Figure 3B:
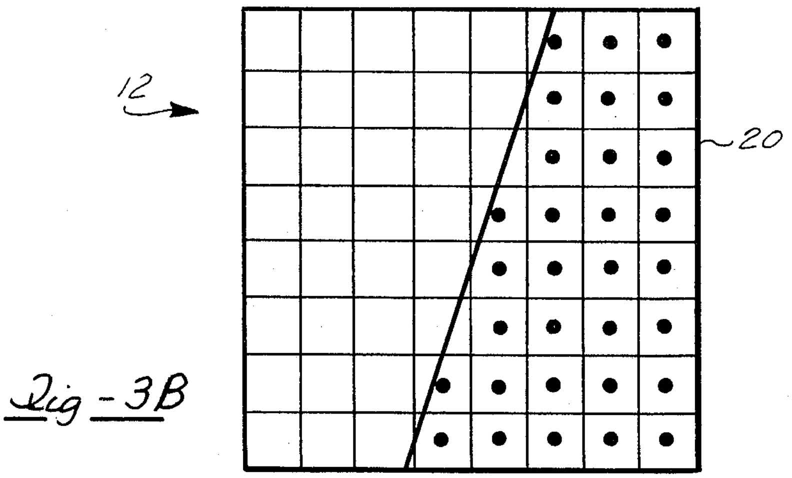
FIG. 3B is a pictorial representation of a point display of the same block element shown in FIG. 3A, but at eight times enlargement.
Figure 3A:
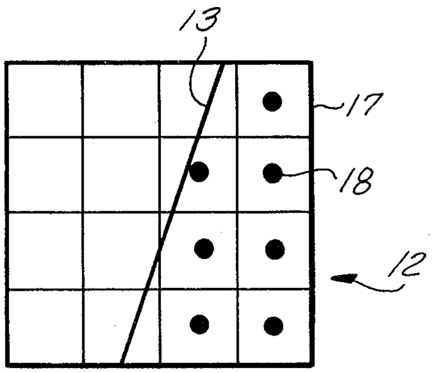
FIG. 3A is a pictorial representation of a point display of one of the block elements of the character matrix shown in FIG. 1 at a four times enlargement.

As shown in FIGS. 3A and 3B, each block element may be viewed as being imaged by an N×N dot matrix. Each block element is evenly segmented, both horizontally and vertically, into N×N sections 17. Each section 17 of the block element matrix is represented by a dot. The dot is "on" or "off" depending on whether the majority of the area which it represents is white or black.

Thus, for a given character size number N, the variable size character generator will have stored therein in memory a dot matrix representation of each block element in a given character which comprises N dots per line and N scan lines per block element. When N equals 1, each block element reduces to a single dot on the CRT screen and will approximately be the same size as characters generated via standard dot matrix techniques. When N equals 2, the character size doubles.

There is shown in FIG. 3A a dot matrix representation of the block element 12 which forms a portion of the character A, depicted in FIG. 1. The geometric pattern or trapezoid 13 which fills a portion of the block element 12 is represented by the black dots 18. In FIG. 3A, a character size of N=4 has been selected. Thus, the variable character size generator of the present invention will generate a block element 12 having four dots per line and four total scan lines. Each segment of the block element matrix shown in FIG. 3A is chosen to be white or black depending on whether the majority of each segment is white or black. Thus, the black dots 18 represent those segments or sections 17 of the block element 12 which have a majority of their respective area being white.

With N equalling 8, the dot matrix representation of the block element 12 is generated as shown in FIG. 3B. In this figure, the block element 20 consists of eight dots per line and eight scan lines. Again, each segment of the block element 20 is chosen to indicate whether the majority of its area is white or black. In this manner, the dot matrix representation of the geometric pattern 13 in the block element 12 is generated having one of a predetermined number of sizes. As can be seen in FIGS. 3A and 3B, the character size may be varied merely by selecting a different character size number N.

E. Simple Code Representation of Block Element Dot Matrices

As shown in FIGS. 3A and 3B, each line of a block element dot matrix consists of a sequence of N dots. Each dot corresponds to a bit which is "1" when the corresponding image area is white and "0" when the corresponding image area is black. This simple binary sequence of dots or bits consists of up to two binary subsequences, each of which consists of all 0's or all 1's. Thus, the binary sequences contain a series of 1's followed by 0's, a sequence of 0's followed by 1's, all 0's or all 1's.

Each of the sequence of dots or bits in each line of a block element can be represented by assigning it a four bit binary code, referred to as the "simple form code". The first three bits of the binary simple form code specify the number of dots or bits of the first subsequence which are of a first state, either 0's or 1's. The fourth bit of the simple form code specifies the state of the first sequence of bits, either "1" or "0", corresponding to a white or black image area representation on the CRT screen.

In the preferred embodiment of the variable character size generator of the present invention, all block element matrices are represented and stored in memory via their simple form code. Thus, for each of the predetermined character sizes N, binary simple form codes for each block element of each of the predetermined number of geometric patterns used to form the composite characters are assigned to each block element on a line-by-line basis. Thus, a maximum of eight sets corresponding to the eight different character sizes used in the preferred embodiment of the present invention are provided for specifying the sequence of the states of the dots used to form each block element and the geometric pattern contained therein for a given character.

Although the simple form codes are described as being stored in memory in the preferred embodiment of the present invention, it will be understood that other circuit arrangements may also be utilized. Thus, for example, a plurality of counters which are selectively preloaded with values corresponding to the number of bits in each dot sequence of a given state may be employed. The outputs from the counters are then decoded to provide the dot sequences to be displayed in imaging each block element. In this case, the bit sequences do not have to be in simple form, i.e., 1's followed by 0's or 0's followed by 1's.

Furthermore, instead of using simple form codes, bit sequences corresponding to the actual states of the points of each block element may be stored directly in memory.

Thus, according to the preferred embodiment of the present invention, each character is defined by a matrix comprised of a plurality of block elements, each block element having one of a predetermined number of distinct geometric patterns disposed therein which form a part of each character. A distinguishable binary code is assigned to each distinct one of the predetermined number of geometric patterns disposed in the block elements of each character on a row-by-row basis for each character matrix. Each block element of a character matrix is defined as having a distinct geometric pattern formed therein via a dot or point matrix, with each point having one or two binary displayable states. A plurality of point matrices are generated for each distinct block element of the entire set of characters to be displayed, each one of the point matrices corresponding to one of the predetermined number of distinct character sizes. A second code is assigned to the sequence of binary states of the points in each point matrix on a line-by-line basis. When it is desired to display a character, a particular character is selected along with one of the predetermined number of character sizes. The codes assigned to the geometric patterns forming the selected character are selected on a row-by-row, column-by-column, basis in the character matrix of the selected character. Codes assigned to the sequence of states of the displayable points in the block elements corresponding to the selected codes assigned to the geometric patterns of the selected character and the selected size of the character to be displayed are selected on a line-by-line basis for each block element of the selected character. These binary codes are decoded to generate control signals which are used to display the selected character having one of the predetermined number of sizes on a point-type display apparatus.

Thus, according to the preferred embodiment of the present invention, one of a predetermined number of distinct character sizes is first selected. The binary simple form codes corresponding to the selected character size and the sequence of states of the dots or bits to be displayed in forming each block element of the geometric character matrix of each character are then stored in memory. A particular character to be displayed is then selected. The index codes of the geometric shapes used to form the selected character are output from memory on a row-by-row, column-by-column basis of the character matrix. The index codes address a memory which outputs the simple form binary codes specifying the sequence of states of the dot matrices of each block element used to form the composite character that has been selected. The simple form codes are sequentially decoded to generate a series of signals which are applied to the CRT screen which displays the selected character or characters thereon at the selected character size.

II. FUNCTIONAL IMPLEMENTATION

Although a dedicated stand alone variable size character generator can be developed in accordance with the teachings of the present invention, greater flexibility and programmability of system parameters may be realized by using a central processor to control a character generator for generating variable size characters which are displayed on a display terminal, such as a CRT.

Figure 4:
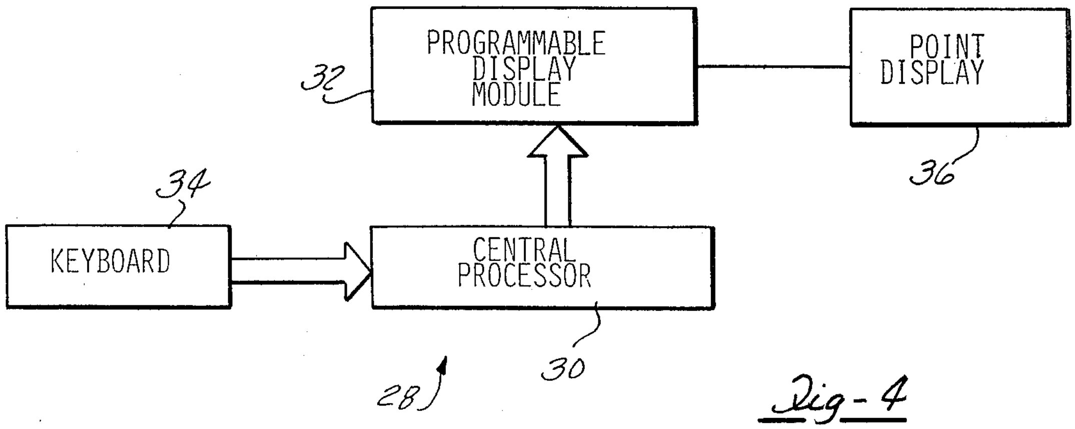
FIG. 4 is a block diagram of the variable size character generator apparatus of the present invention.

As shown in FIG. 4, a varible size character generator apparatus 28 constructed in accordance with the teachings of a preferred embodiment of the present invention comprises a central processor 30, a character generator or programmable display module 32, an alphanumeric keyboard 34 and a point display 36.

The central processor 30 preferably comprises a microprocessor based subsystem, such as the conventionally available 8080 based system utilizing common bus structure, programming techniques, etc.

Although an 8080 microprocessor is utilized in the preferred embodiment of the present invention, other microprocessor based systems, as well as any commercially available computer processor may also be used to practice the present invention.

The central processor 30 operates to control the flow of data and control signals between the various components of the variable size character generator 28 of the present invention. The central processor 30 programs the system parameters, such as character size, and controls rolling, crawling and scrolling techniques, as described hereafter. Further, the central processor 30 acts as a means for selecting the character to be displayed and its size. It loads the characters to be displayed from its own internal memory or from the keyboard 34 into the programmable display module 32. In addition, the central processor 30 may act as a remote terminal in a conventional computer terminal system. In this mode of operation, the central processor 30 receives block data, i.e., displayable information, from a host computer and transmits the data to the programmable display module 32 which selectively enlarges the data for display on the point display 36.

The keyboard 34 is in the form of a standard alphanumeric ASCII compatible keyboard having a 128 character set. The character set includes the standard 96 displayable characters, alphanumeric, punctuation, etc., as well as other special function keys control character size selection, roll, crawl and miscellaneous functions. A character selected on the keyboard 34 is input to the central processor 30 and is transmitted from the central processor 30 to the programmable display module 32 for enlargement and subsequent display.

The character generator or programmable display module 32, which will be described in greater detail hereafter, functions under the control of the central processor 30, to enlarge characters to a predetermined size and to supply the enlarged character information to the point display 36.

The point display 36 may be any conventional matrix type-dot display apparatus, such as a CRT screen or matrix dot printer. Preferably, the point display 36 comprises a CRT raster scan device.

Figure 5:
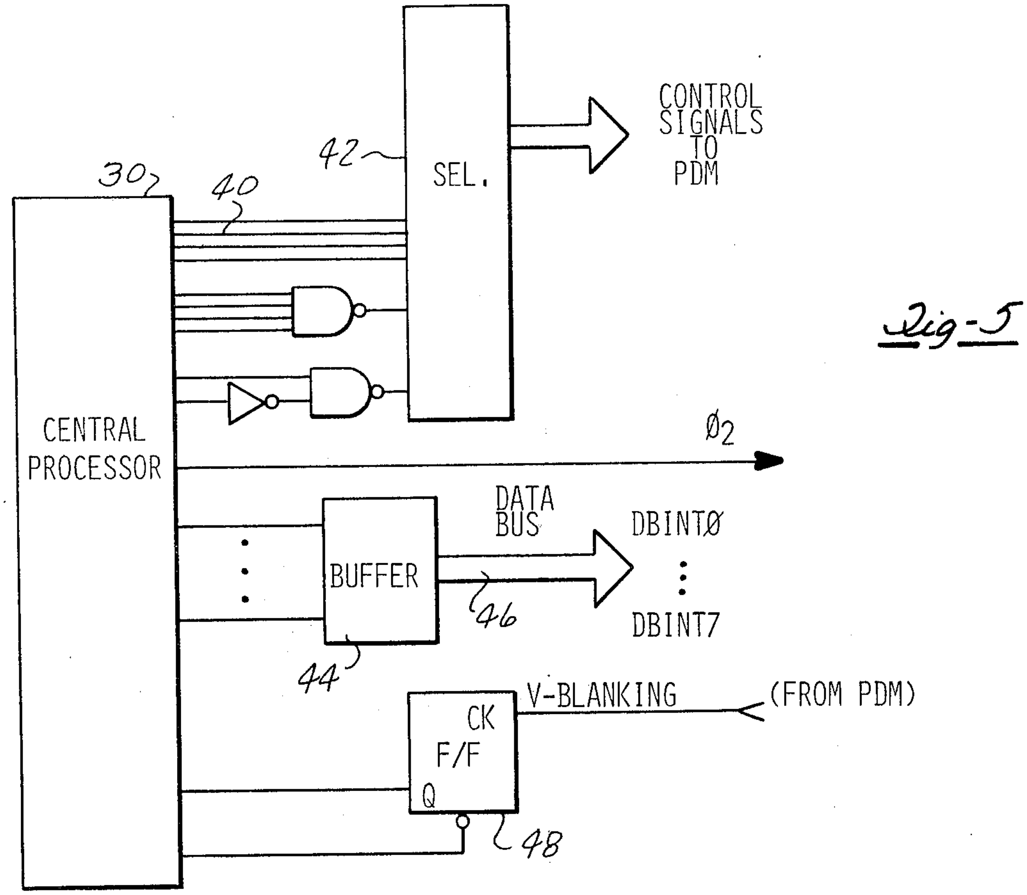
FIG. 5 is a block diagram of the system interface between the central processor and the programmable display module.

Referring now to FIG. 5, there is shown a block diagram of the interface and control circuit between the central processor 30 and the programmable display module 32. For clarity, only those address lines and output ports of the central processor 30 that are utilized by the programmable display module 32 are illustrated. Selected output ports 40 of the central processor 30 are connected to a data selector 42. When one of the output ports of the central processor 30 is selected under program control, the address generated thereby is input to the data selector 42 which generates an appropriate output control signal which, in turn, is used to control the loading of the various registers and counters in the programmable display module 32, as described hereafter.

The system clock $\phi_2$ is used to synchronize the gating and loading of data into the various registers and counters of the programmable display module 32 during the transfer of information between the central processor 30 and the programmable display module 32. The data is transferred through a buffer 44 to a data bus 46 for input to the various registers and counters of the display module 32.

An interrupt flip flop 48 is connected as an input to the central processor 30 and is under the control of the programmable display module 32. When the vertical drive signal on the CRT 36 goes low at the beginning of the vertical blanking period, i.e., the electron beam is returned to the top of the screen to begin another frame scan, flip-flop 48 will be set which causes an interrupt in the central processor 30 as well as a system disable. During the disable condition, the counters and memories within the programmable display module 36, as described hereafter, are disabled from counting or outputting data and are or can be reprogrammed.

Figure 6:
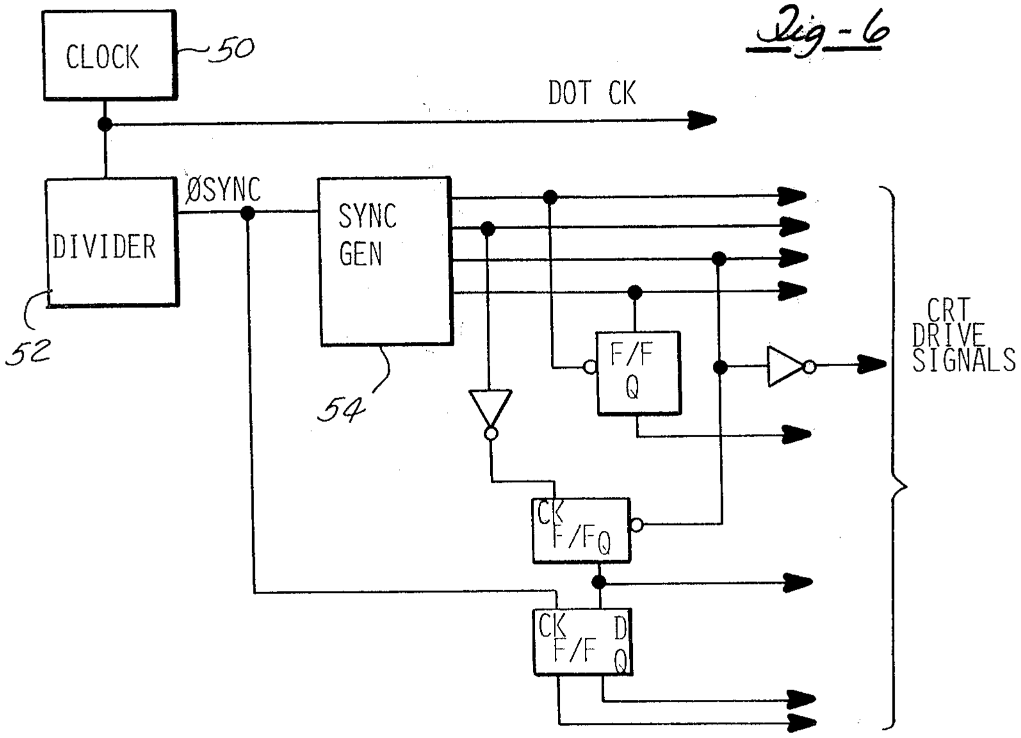
FIG. 6 is a block diagram of internal clock and video-sync generator circuitry of the programmable display module.

Referring now to FIG. 6, there is shown the internal clock circuitry and video control signal circuit in the programmable display module 32 which are used to drive the CRT display 36. The master clock 50 comprises a crystal controlled clock which operates at 10.1 MHz and generates the DOT CK signal for controlling the display of dots on the CRT screen 36. The 10.1 MHz frequency clock was selected to provide discrete dots on the display. It will be understood that differing clock rates may also be used to provide wider or narrower display points as desired. The output of the master clock 50 is input to a divider 52 which generates a $\phi$-sync signal at 1.26 MHz which drives the input clock of the sync generator 54. The sync generator 54 is a standard circuit, such as one sold commercially by National Semiconductor, Inc., Model Number MM5321, which operates to provide the necessary control and timing signals for a CRT raster scan device.

Figure 7:
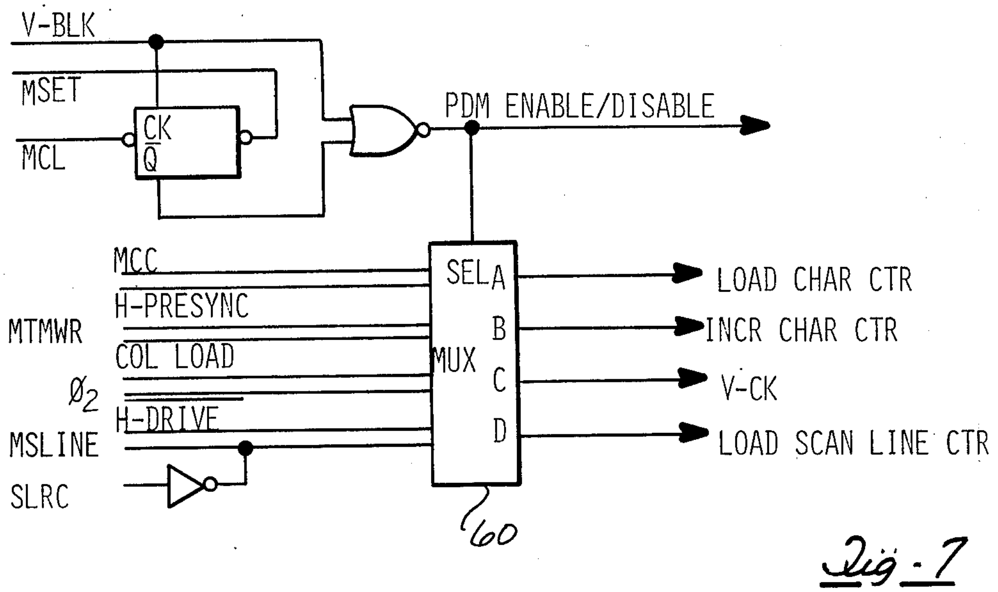
FIG. 7 is a block diagram of the programmable display module enable/disable circuit.

The enable/disable circuit of the programmable display module 32 is depicted in FIG. 7. In general, the programmable display module 32 is enabled at the end of the vertical blanking period of the CRT screen 36 and is disabled at the start of the vertical blanking period or via a command from the central processor 30.

When disabled under central processor 30 control, the various dot, column, scan line, row, character and text line counters, described hereafter, are disabled from counting, and the transfer of index code information from the programmable display module memory is halted. During this disable mode, certain counters can be loaded with preset values, under central processor control, to initiate various scrolling, rolling or crawling techniques, as described hereafter.

When enabled, various control signals are selected through multiplexer 60 which are used to reload the various counters with display timing control information.

Figure 8:
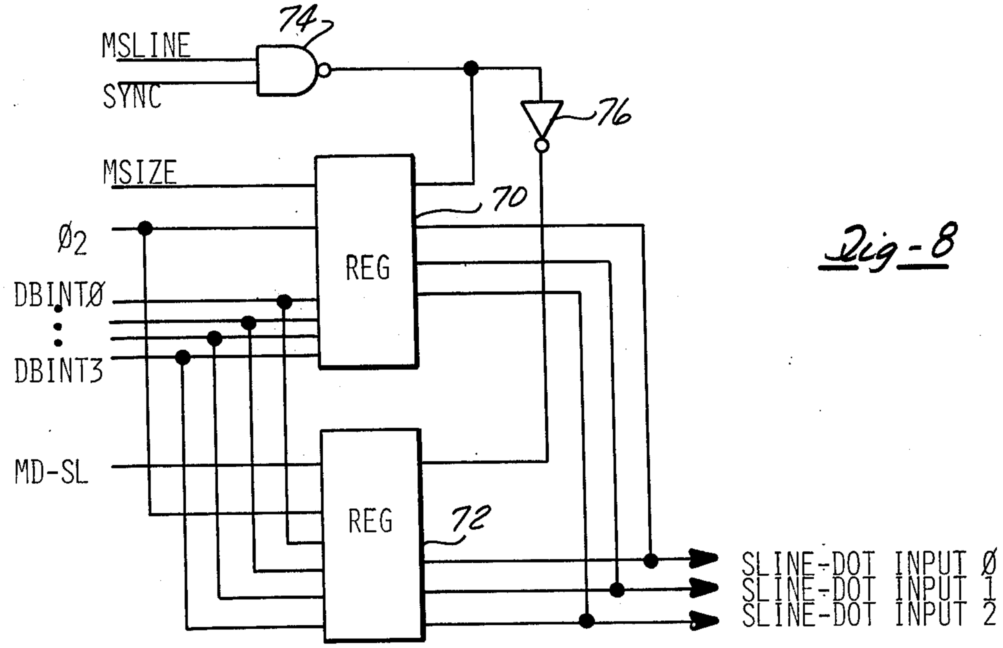
FIG. 8 is a block diagram of the size and scan line-dot registers of the programmable display module.
Figure 9:
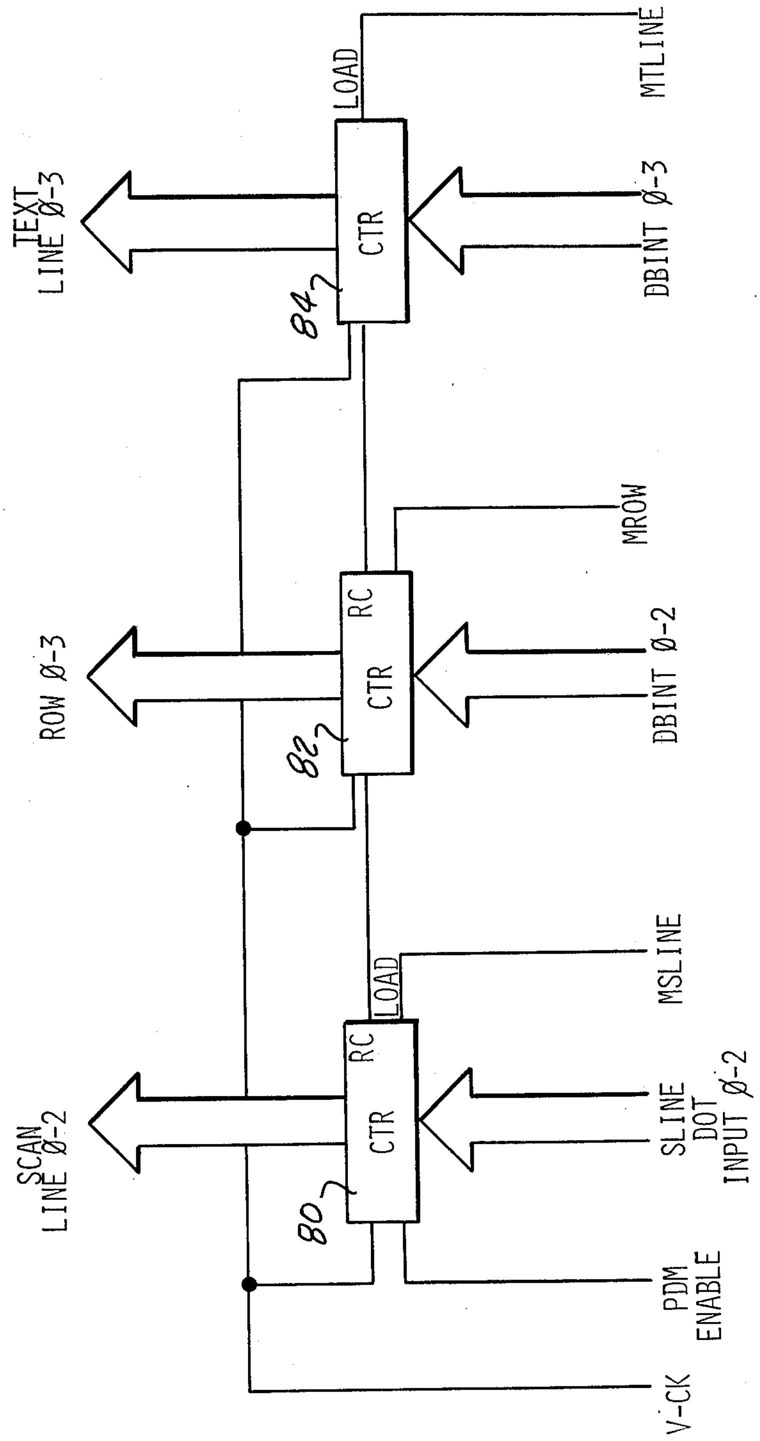
FIG. 9 is a block diagram of the vertical timing circuitry of the programmable display module.

The character size register 70, shown in FIG. 8, is programmed with 8-N character size information via central processor control signal labelled MSIZE. Data is loaded via the programmable display module data bus 46 on control lines DBINTØ–3. This data is input to the scan line and dot counters, described hereafter, and is used to control the counting sequences of these counters. The scan line and dot counters 80 and 90, respectively, FIG. 9, are loaded with the number 8−N from the size register 70 after each counter achieves a count of 7, indicating the end of the display of a particular block element.

The scan line-dot register 72 also receives data information via the programmable display module (PDM) data bus 46. This data is used to load initial values into the scan line and dot counters 80 and 90 under central processor or timing control.

The size register 70 and scan line-dot register 72 are selected under the control of register select logic consisting of NAND gate 74 and inverter 76. During a PDM disable, an output signal from the central processor 30 labelled MSLINE puts the size register 70 into a high impedance mode and enables the scan line-dot register 72. The initial scan line values are then loaded from the scan line-dot register 72 into the scan line counter 80, FIG. 9. The horizontal sync signal enables the scan line-dot register 72. The dot register is re-initialized during the sync when the scan line-dot register value is loaded into the dot counter 90. Otherwise, the size register 70 is enabled.

In an alternate embodiment, the character size register 70 and scan line-dot register 72 circuit is duplicated such that the number of dots per line may be selected to equal Nw and the number of scan lines per block element to equal $N_H$, where $Nw \neq N_H$. In this manner, characters having unequal widths and heights may be generated.

Referring now to FIG. 9, there is shown the vertical timing circuitry of the programmable display module 32. As shown therein, the vertical timing circuitry consists of three counters: scan line counter 80, row counter 82 and text line counter 84. These counters are re-initialized during each vertical blanking period of the CRT.

The scan line counter 80 counts during PDM enable from 8−N to 7. The scan line counter 80 increments at the vertical clock rate (V−CK) and, when it equals 7, reloads 8−N from the size register 70 on the next clock pulse. During PDM disable, the scan line counter 80 is reloaded or initialized by first loading its initial value into the scan line-dot register 72, FIG. 8, via an output to MSLINE from the central processor 30. An output to MSLINE then loads the scan line counter 80 with data from the scan line-dot register 72. An output to MD-SL enables the scan line-dot register 72 while disabling the size register 70.

The row counter 82 counts from 0 to 15 during PDM enable and increments when the scan line counter 80 reloads with 8−N. During the PDM disable, the row counter 82 is re-initialized via an output to line MROW.

The text line counter 84 counts from 0 to 15 during PDM enable. It increments when the row counter 82 rolls over from 15 to 0. During PDM disable, the text line counter 84 is re-initialized via an output to MTLINE.

The programmable scan line counter 80 counts from 8−N through 7 using three counter bits. The number of lines counted depends on the character size number N or, equivalently, the number of scan lines that comprise each row of the character matrix. The scan line 80 provides the four bit scan line address used to access the proper simple form codes from memory. During display, the scan line counter 80 increments at the beginning of each horizontal drive pulse. When its count value is 7, signifying the last scan line of the present row, the counter will be loaded with 8−N (the binary compliment of the size number minus 1) from the size register 70 at the beginning of the next horizontal drive pulse to point to the first scan line of the next row of the character matrix.

The row counter 82 counts from 0 to 15 and points to the row in the character matrix to be displayed. The row counter 82 provides addressing information used in the memories of the programmable display module 32. Each time the scan line counter 80 changes from 7 to 8−N, the row counter 82 is incremented to point to the next row to be displayed. After display of the last scan line (scan line 7) of the last row (row=15), the row counter 82 rolls over to zero to point to the first row of the next text line.

The text line counter 84 points to the text line being displayed. It increments when the row counter 82 rolls over from 15 to 0. After the 15th text lines, the text line counter 84 rolls over to zero.

Figure 10:
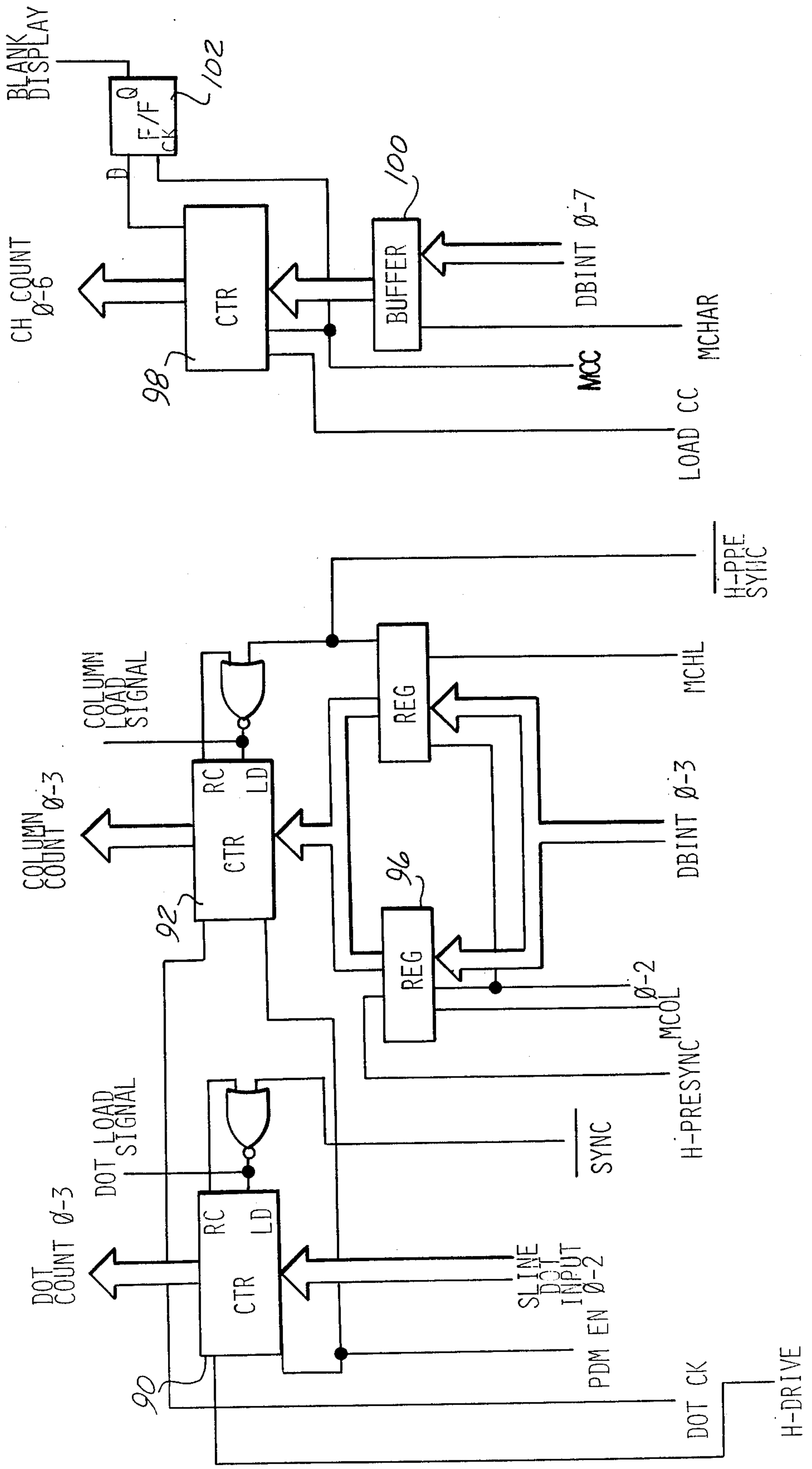
FIG. 10 is a block diagram of the horizontal timing circuitry of the programmable display module.

The horizontal timing circuitry for the programmable display module 32 is depicted in FIG. 10. The horizontal timing circuitry includes dot counter 90, column counter 92 and character counter 98.

The dot counter 90 counts from 8−N to 7 and counts the number of dots per column of the displayed block element dot matrix. The dot counter 90 is used to decode the simple form sequences of binary states of each point in a block element. When the dot counter 90 count reaches 7, it is reloaded with 8−N from the size register 80 on the next clock pulse.

The column counter 92 counts the columns of the character matrix that are being displayed. It is used to select the appropriate memory buffers, as described hereafter, which contain the simple form binary codes of dot sequences. The outputs of character length register 94 and column register 96 are input to the column counter 92. The column counter 92 counts from M to 15, where $M \geqq 8$, and determines the number of spacing columns between successive characters. When the dot count equals 7 and the column count equals 15 at the end of a character display, the column counter 92 reloads with M from the character length register 94 on the next clock pulse. The value of M is loaded into the character length register 94 via an output from the central processor on control line MCHL.

During H-PRESYNC, the character length register 94 is disabled and the column register 96 is enabled. During this period, the column counter 92 is reloaded from the column register 96. The initial value is loaded into the column register 96 via an output to line MCOL from the central processor 30.

The value of the character counter 98 points to the character in the line of text to be displayed. It increments when the column load signal goes from low to high during PDM enable. During PDM disable, the character counter 98 increments at the end of each text memory write cycle.

Character register 100 contains the initial value of the first character in a text line to be accessed for display. The value is loaded into the character counter 98 during H-PRESYNC. During PDM disable, the value stored in the character register 100 is the initial count of the characters to be loaded into a text memory line. The character counter 98 is then loaded with this value via an output to MCC. The character register 100 is loaded via an output to MCHAR from the central processor 30.

One character count after the character is accessed from the text memory, the character is displayed. Character counts 128 to 255 on each scan line are displayed as a blank field. One character count after the character count equals 127, flip flop 102 goes high to select the blanking register 126, FIG. 11, to blank the CRT screen.

Figure 11:
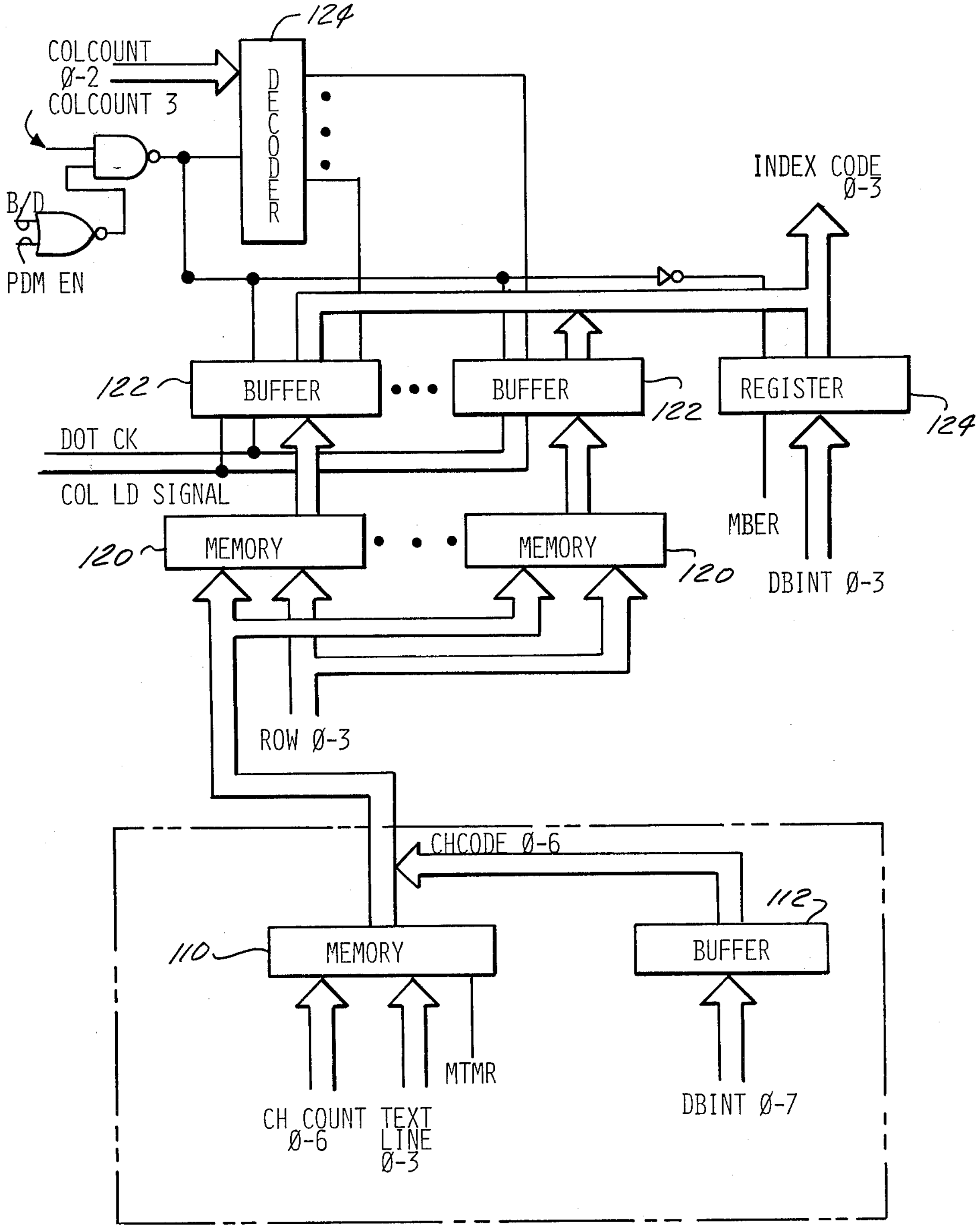
FIG. 11 is a block diagram of the text memory and index code memory circuit of the programmable display module.

Referring now to FIG. 11, there is shown a text memory 110 which contains the character codes of the characters to be displayed. The character codes are used to select appropriate character matrix data from the character generator memory 120, as described hereafter. The text memory 110 is formed of four 1024×4 bit RAM memory chips which are addressed by text line and character count information.

During the PDM disable mode, the text memory 110 can be loaded with new character information. When the text memory 110 is being written to by the central processor 30, the tri-state buffers 112 are enabled. Text memory data then passes from the PDM data bus 46 onto the text memory I/O lines through buffers 112.

The index codes specifying one of the predetermined number of geometric patterns formed in each block element of a particular character are stored in a first memory means 120. Preferably, the first memory means 120 is an 8 bit array ROM memory. Four 2K byte ROM chips are used to form the first memory means 120. The four 8 bit wide ROM chips form a 32 bit wide memory array which is divided into eight 4 bit sections, each corresponding to one of the eight columns of the character matrix array. The memory 120 is accessed by character code information output from the text memory 110 and the row count of the character matrix currently being displayed. The output of the eight columns of the ROM character memory 120 is loaded into eight tri-state buffers 122 when the character counter 98 increments to its next value. The buffers 122 are sequentially selected, one at a time, corresponding to one column of a character matrix, under the control of the output of decoder 124 which is selected by column count information from column counter 92, shown in FIG. 10.

Thus, the index codes specifying the particular geometric patterns which are displayed in each line of block elements of a character matrix are sequentially output from the first memory 120 via buffers 122.

The blanking register 126 is selected to generate a blank screen or to blank a portion of the CRT screen when the column count is less than eight so as to generate spacing between adjacent characters, when the blank/display character count is high in order to blank the screen when the character count exceeds 127 or during PDM disable. At this time, the blanking register is enabled and the eight index code ROM buffers 122 are disabled, thereby blanking at least that particular section of the CRT screen.

Figure 12:
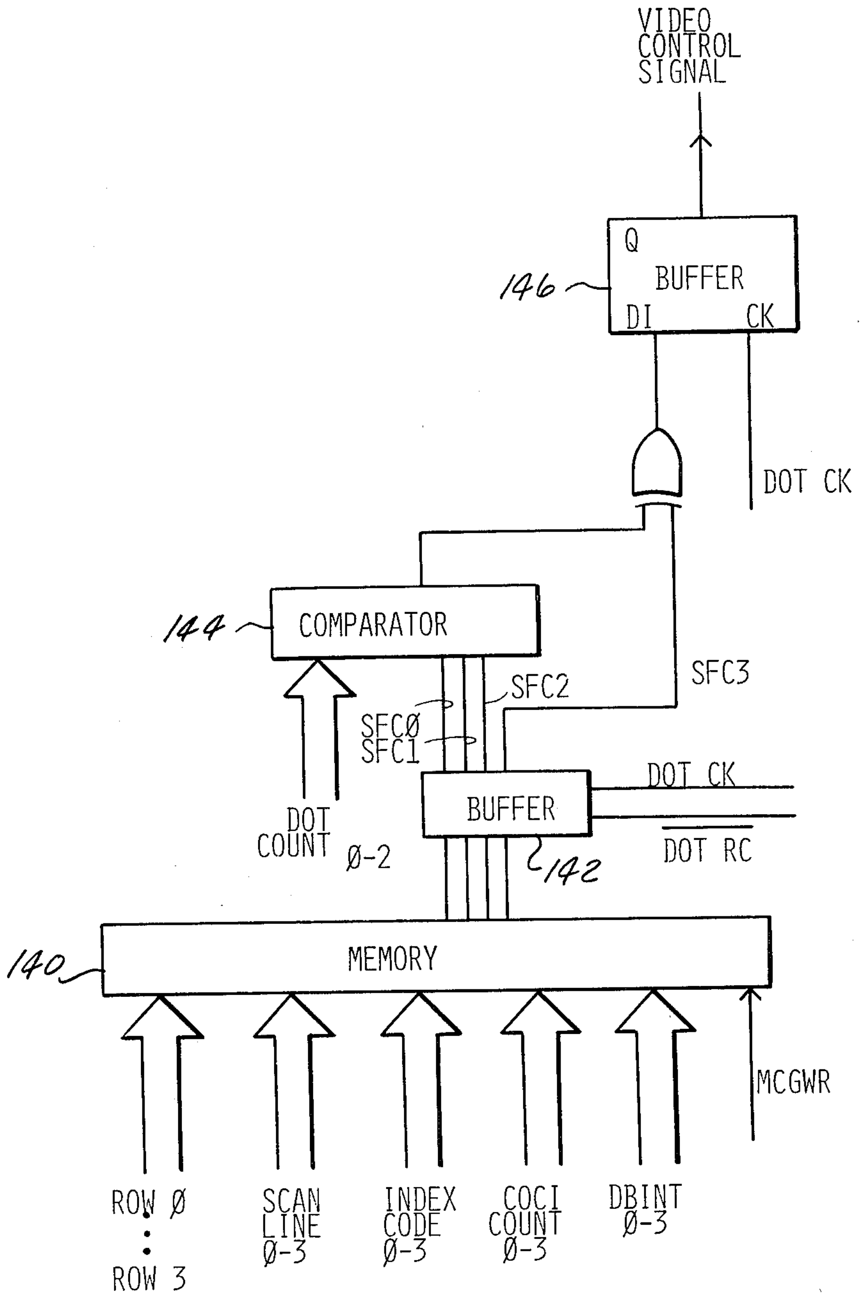
FIG. 12 is a block diagram of the point sequence code memory and the video decode logic circuits of the programmable display module.

Also shown in FIG. 12 is a first means which is responsive to the output from memory 120 for generating second binary codes corresponding to the sequence of binary states of the points defining the point matrices of each block element of the selected character on a line-by-line basis for each block element. The second binary codes correspond to the selected character size for the selected character.

In the preferred embodiment shown in the first generating means comprises a second memory means 140 which is utilized to store the simple form block element codes. Preferably, the second memory means 140 comprises four 4K×1 bit RAM memory chips. When taken together in parallel, the four RAM chips comprise a 4K×4 bit RAM array. The RAM memory array is divided into two sections, one used to store the even column covering sets and the other section storing the odd column covering sets.

The simple form codes stored in the second memory means 140 correspond to a selected character size and are loaded into the memory 140 from the central processor 30. Alternately, a large capacity memory, preferably a ROM-type memory, may be used to form the second memory means 140. In this embodiment, the simple form codes for all possible sizes of the displayable characters are stored in the second memory 140 and addressed by the selected character size number.

The memory 140 is loaded by first setting the address and then outputting the memory data via the MCGWR port from the central processor 30. Each time the column counter increments, on the dot clock pulse after the dot count equals 7, the data from the memory 140 is output into a buffer 142 for decoding.

In an alternate embodiment, not shown, a plurality of counters are used in place of the second memory means 140. The counters correspond to one of the predetermined number of geometric patterns used to form the characters and are selected by the index codes output from the first memory 120. Each counter is selectively incremented or decremented at the end of each scan line of a block element, with the output being decoded, as described hereafter, to form the sequence of signals corresponding to the states of the displayable dots.

Second means which is responsive to the second binary codes output from the second memory 140 is provided for generating binary sequences of signals on a point-by-point basis for forming the selected character having a selected size.

In a preferred embodiment, the second generating means comprises means for decoding the second binary codes. The simple form binary code contained in buffer 142 is input to a comparator 144 which compares the value of the first three bits of the simple form code with the value of the dot count. The output of the comparator 144 is at a low level until the dot count exceeds the value of the first three bits of the binary simple form code. The fourth simple form code bit SFC3 determines if the first series of dots of the dot sequence of a particular line of a block element are a "1" or a "0". If SFC3 is high, the sequence of dots that will be initially displayed consists of 1's followed by 0's. If SFC3 is low or "0", the dot sequence consists of a series of 0's followed by 1's.

After the state of each dot of the simple form code is decoded, its value is clocked bit-by-bit into a dot buffer 146 for display. The video control signal output from the buffer 146 is combined with the composite sync and composite blanking signals to form a composite video signal for the CRT display, as in conventionally known.

In an alternate embodiment, not shown, the actual state of the dots in each line of a block element may be stored as a word in the second memory 140 instead of the simple form codes. Each word is then output from the second memory on a line-by-line basis for each block element and input to a shift register. The bits are then sequentially clocked out of the shift register into the buffer 146 for display on the CRT screen.

Figure 13:
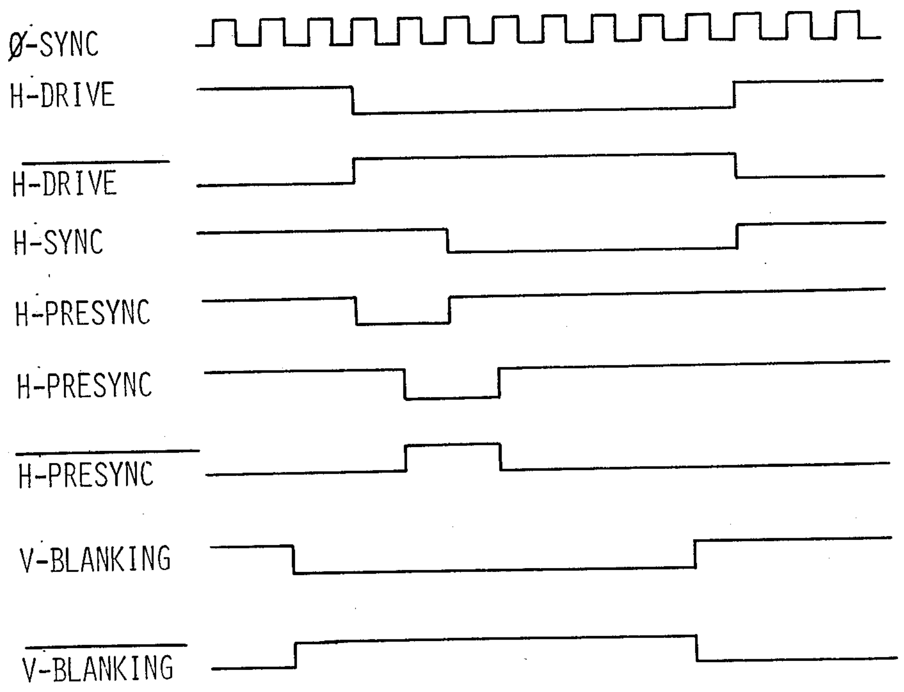
FIG. 13 is a waveform representation of the vertical and horizontal video timing signals used to display characters on the CRT terminal.

For a more complete understanding of the operation of the variable size character generator of the present invention, there is illustrated in FIG. 13, various timing waveforms generated by the sync generator 54, shown in FIG. 6, which are used to control the operation of the point display CRT screen 36. The use of these signals is conventionally known and, as such, a detailed description will be presented herein.

The proper display of data on the CRT screen depends on clocking the successive scan lines of the dot sequences that form the character onto the screen at the appropriate time. Vertical display timing is controlled by the three cascaded counters 80, 82 and 84, shown in FIG. 9. During the vertical blanking period that precedes each display frame, the three counters 80, 82 and 84 that control vertical timing are inactive. During each vertical blanking period, the three counters 80, 82 and 84 must be reprogrammed with initial values to ensure proper vertical display formatting. The three contours 80, 82 and 84 can be independently programmed via the central processor 30 to any allowable value. Thus, any particular scan line, row or text line can be selected to be displayed at the top of the CRT screen at the beginning of a new frame.

The CRT screen is refreshed at a rate of sixty frames per second. By dynamically altering the values of the scan line, row and text line counters 80, 82 and 84, respectively, during the vertical blanking period, data can be made to move up or down the screen 36. When the display data is moved incrementally up or down at the refresh rate of the CRT screen, the display information appears to continuously roll across the screen, either up or down. This enables the user of the variable size character generator of the present invention to view any portion of the computer text or output by merely controlling the initial values that are programmed into the scan line, row and text line counters 80, 82 and 84. Vertical scrolling is implemented by changing the initial value of the text line counter 80 alone.

The same technique can be applied to cause the displayed character information to crawl or move horizontally right or left across the CRT screen. To achieve this, the initial values of the dot, column and character counters 90, 92 and 98 are dynamically altered during the vertical blanking period under program control of the central processor 30. Horizontal scroll is implemented by incrementing or decrementing the character register.

Thus, there has been a unique variable size character generator which is capable of generating a large number of different sized characters which remain well defined, clearly legible and undistorted. Further, the displayed character information can be made to move horizontally or vertically across the screen such that the user can view any portion of the enlarged data.

What is claimed is:

1. An apparatus for generating variable size, point display characters comprising:

means for selecting a character to be displayed;

means for selecting one of a predetermined number of distinct character sizes for the selected character;

character generator means, responsive to the means for selecting a character and the means for selecting a character size, for generating the selected character having the selected one of a predetermined number of distinct sizes, the character generator means comprising:

first memory means for storing first binary codes assigned to each distinct geometric pattern disposed in a block element of a character matrix defining each character to be displayed on a row-by-row, column-by-column basis;

first means for addressing the first memory to output therefrom selected ones of the first binary codes corresponding to the selected character on a row-by-row, column-by-column basis of the selected character matrix;

first means, responsive to the output of the first memory means, for generating second binary codes corresponding to the sequence of binary states of the points defining the point matrices of each block element of the selected character on a line-by-line basis for each block element, the second binary codes corresponding to the selected one of the predetermined number of distinct character sizes; and second means, responsive to the second binary codes, for generating binary sequences of signals on a point-by-point basis for generating the selected character having the selected character size.

2. The character generating apparatus of claim 1 wherein the second generating means comprises means for decoding the second binary codes.

3. The character generating apparatus of claim 1 wherein the first generating means comprises:

second memory means for storing the second binary codes; and second means for addressing the second memory means to output therefrom selected ones of the second binary codes on a line-by-line basis for each block element of the selected character.

4. The character generating apparatus of claim 3 wherein the first addressing means includes first counter means for determining the current row of the character matrix being generated;

the first memory means being responsive to the first counter means and the means for selecting a character.

5. The character generating apparatus of claim 4 wherein the second addressing means includes:

second counter means for determining the current line of points within each block element of a row of the character matrix being generated; and third counter means for determining the current column of the character matrix being generated;

the second memory means being responsive to the output of the first, second and third counter means and the output of the first memory means.

6. The character generating apparatus of claim 1 wherein the means for selecting a character to be generated comprises:

a central processor means disposed in data communication with the character generator means.

7. The character generating apparatus of claim 6 further including:

an alphanumeric keyboard connected to the central processor means, the keyboard being operative to input the selected character and character size to be generated.

8. The character generating apparatus of claim 1 further including:

third memory means for storing a plurality of binary codes corresponding to groups of characters to be sequentially generated in a text arrangement;

the output of the third memory means being input to the first memory means.

9. The character generating apparatus of claim 8 further including:

fourth counter means for determining the current character in the group of characters being generated; and fifth counter means for determining the current line of the text of a group of characters being generated.

10. The character generating apparatus of claim 1 further including means, responsive to the character generating means, for displaying point-type characters.

11. The character generating apparatus of claim 10 wherein the displaying means comprises a raster scan type video display apparatus.

12. The character generating apparatus of claim 5 further including:

central processor means disposed in data communication with the character generator means for selecting a character to be generated;

means responsive to the character generating means for displaying point-type characters, the displaying means including a raster scan type video display apparatus;

the central processor means being operative to reload the first, second and third counter means with constant initial values at the beginning of each scan of the video display apparatus.

13. The character generating apparatus of claim 12 wherein the central processor means is operative to selectively change under operator control the initial value loaded into the first, second and third counter means at the beginning of each scan of the video display apparatus such that the displayed character information selectively moves at least one of vertically and horizontally across the video display apparatus.

14. An apparatus for generating variable size, point display characters comprising:

central processor means for generating control signals used to control data flow and for selecting a character to be displayed and one of a predetermined number of distinct character sizes;

the character generator means comprising:

first memory means for storing first binary codes assigned to each distinct geometric pattern disposed in a block element of a character matrix defining each character to be displayed on a row-by-row, column-by-column, basis;

first means for addressing the first memory to output therefrom selected ones of the first binary codes corresponding to the selected character on a row-by-row, column-by-column basis of the selected character matrix;

first means, responsive to the output of the first memory means, for generating second binary codes corresponding to the sequence of binary states of the points defining the point matrices of each block element of the selected character on a line-by-line basis for each block element, the second binary codes corresponding to the selected one of the predetermined number of distinct character sizes;

second means, responsive to the second binary codes for generating binary sequences of signals on a point-by-point basis, for generating the selected character having the selected character size; and means, responsive to the binary sequences of signals from the second generating means, for displaying the selected character having a selected size in a point-type dot matrix.

15. The character generating apparatus of claim 14 wherein the second generating means comprises means for decoding the second binary codes.

16. The character generating apparatus of claim 14 wherein the first generating means comprises:

second memory means for storing the second binary codes; and second means for addressing the second memory means to output therefrom selected ones of the second binary codes on a line-by-line basis for each block element of the selected character.

17. The character generating apparatus of claim 16 wherein the first addressing means includes first counter means for determining the current row of the character matrix being generated;

the first memory means being responsive to the first counter means and the means for selecting a character.

18. The character generating apparatus of claim 17 wherein the second addressing means includes:

second counter means for determining the current line of points within each block element of a row of the character matrix being generated; and third counter means for determining the current column of the character matrix generated;

the second memory means being responsive to the output of the first, second and third counter means and the output of the first memory means.

19. The character generating apparatus of claim 14 further including:

an alphanumeric keyboard connected to the central processor means, the keyboard being operative to input the selected character and character size to be generated.

20. The character generating apparatus of claim 11 further including:

third memory means for storing a plurality of binary codes corresponding to groups of characters to be sequentially generated in a text arrangement;

the output of the third memory means being input to the first memory means.

21. The character generating apparatus of claim 20 further including:

fourth counter means for determining the current character in the group of characters being generated; and fifth counter means for determining the current line of the text of a group of characters being generated.

22. The character generating apparatus of claim 11 wherein the displaying means comprises a raster scan type video display apparatus.

23. The character generating apparatus of claim 18 wherein the central processor means is operative to reload the first, second and third counter means with constant initial values at the beginning of each scan of the video display apparatus.

24. The character generating apparatus of claim 23 wherein the central processor means is operative to selectively change the initial values loaded into the first, second and third counter means at the beginning of each scan of the video display apparatus such that the displayed character information selectively moves in at least one of vertical and horizontal direction across the video display apparatus.

25. A method of generating variable size point display characters comprising the steps of:

(A) defining each character by a matrix comprised of a plurality of block elements, each block element having one of a predetermined number of geometric patterns forming a part of each character, disposed therein;

(B) assigning a distinguishable code to each distinct one of the predetermined number of geometric patterns in each character on a row-by-row, column-by-column basis for each character matrix;

(C) defining each block element of a character matrix having a distinct geometric pattern formed therein by a point matrix, each point having one of two binary displayable states;

(D) generating a plurality of point matrices for each distinct block element of the entire set of characters to be displayed, each one of the point matrices corresponding to one of the predetermined number of character sizes;

(E) assigning a binary code to the sequence of binary states of the points in each point matrix on a line-by-line basis;

(F) selecting a character and a predetermined size of the character to be displayed;

(G) selecting codes assigned to the geometric patterns corresponding to the selected character on a row-by-row basis of the character matrix;

(H) selecting codes assigned to the sequence of states of the displayable points in a block element corresponding to the selected codes assigned to the geometric patterns of the selected character and the selected size of the character to be displayed on a line-by-line basis for each block element of the selected character; and (I) decoding the selected codes defining the sequence of states of the displayable points to generate control signals for displaying the selected character having the selected size on a point display apparatus.

26. The method of claim 25 wherein the codes assigned to each distinct one of the predetermined number of geometric patterns forming each character are formed in two sets for each row of the character matrix;

the first set comprising the codes assigned to each distinct one of the predetermined number of geometric patterns disposed in the even numbered columns of the character matrix; and the second set comprising the codes assigned to each distinct one of the predetermined number of geometric patterns disposed in the odd numbered columns of the character matrix.

27. The method of claim 26 wherein the first and second sets of codes are respectively comprised of the codes assigned to each distinct one of the predetermined number of geometric patterns disposed in the even and odd columns of the character matrices of the set of all displayable characters.

28. The method of claim 26 wherein each of the first and second sets contains the codes for a maximum of sixteen distinct geometric patterns.

29. The method of claim 28 wherein the geometric patterns include triangles, trapezoids and elliptical sections.

30. The method of claim 25 further including the step of displaying the selected character having a selected character size on a raster scan type video display apparatus.

31. The method of claim 30 further including the steps of:

tracking the point of the character matrix currently being displayed on the raster scan video display apparatus, both vertically and horizontally; and selectively changing at least certain of the binary numbers corresponding to the point of the character matrix currently being displayed at the refresh rate of the raster scan video display apparatus such that the character being displayed moves in at least one of the vertical and horizontal directions across the screen of the video display apparatus.

* * * * *